United States Patent
Koledin et al.

(10) Patent No.: US 12,170,082 B1
(45) Date of Patent: Dec. 17, 2024

(54) ON-THE-FLY TRANSCRIPTION/REDACTION OF VOICE-OVER-IP CALLS

(71) Applicant: Medallia, Inc., San Francisco, CA (US)

(72) Inventors: Stephan Koledin, Pittsburgh, PA (US); John Kuhns, Pittsburgh, PA (US); Wayne Ramprashad, Pittsburgh, PA (US)

(73) Assignee: Medallia, Inc., San Francisco, CA (US)

( * ) Notice: Subject to any disclaimer, the term of this patent is extended or adjusted under 35 U.S.C. 154(b) by 1254 days.

(21) Appl. No.: 16/371,011

(22) Filed: Mar. 31, 2019

(51) Int. Cl.
| | |
|---|---|
| *G10L 15/22* | (2006.01) |
| *G06F 21/62* | (2013.01) |
| *G10L 15/16* | (2006.01) |
| *G10L 15/183* | (2013.01) |
| *H04M 7/00* | (2006.01) |
| *H04M 3/42* | (2006.01) |

(52) U.S. Cl.
CPC ........... *G10L 15/22* (2013.01); *G10L 15/16* (2013.01); *G10L 15/183* (2013.01); *H04M 7/006* (2013.01); *H04M 3/42221* (2013.01)

(58) Field of Classification Search
CPC .............................. G10L 15/22; G06F 21/6254
USPC .................................................. 704/251, 235
See application file for complete search history.

(56) References Cited

U.S. PATENT DOCUMENTS

| | | | |
|---|---|---|---|
| 5,293,450 A | 3/1994 | Kane et al. | |
| 5,566,272 A | 10/1996 | Brems et al. | |
| 5,627,939 A | 5/1997 | Huang et al. | |
| 5,758,256 A | 5/1998 | Berry et al. | |
| 5,870,397 A | 2/1999 | Chauffour et al. | |
| 6,151,576 A | 11/2000 | Warnock et al. | |
| 6,336,090 B1 | 1/2002 | Chou et al. | |
| 6,603,921 B1 | 8/2003 | Kanevsky et al. | |
| 6,785,650 B2 * | 8/2004 | Basson .................. | G10L 15/22 704/235 |
| 7,035,794 B2 | 4/2006 | Sirivara | |
| 7,136,877 B2 | 11/2006 | Volcani et al. | |
| 7,362,811 B2 | 4/2008 | Dunne et al. | |
| 8,392,198 B1 | 3/2013 | Berisha et al. | |
| 9,105,053 B2 | 8/2015 | Cao et al. | |
| 9,123,342 B2 | 9/2015 | Chen et al. | |
| 9,405,053 B2 | 8/2016 | Lin | |
| 2003/0046071 A1 | 3/2003 | Wyman | |
| 2004/0039566 A1 | 2/2004 | Hutchison et al. | |
| 2005/0187768 A1 | 8/2005 | Godden | |
| 2007/0294084 A1 * | 12/2007 | Cross ........................... | 704/251 |
| 2008/0103761 A1 | 5/2008 | Printz et al. | |
| 2010/0223056 A1 | 9/2010 | Kadirkamanathan | |
| 2012/0109649 A1 | 5/2012 | Talwar et al. | |
| 2015/0287405 A1 | 10/2015 | Biadsy et al. | |
| 2020/0110902 A1 * | 4/2020 | Zakour .............. | G06F 21/6254 |

(Continued)

OTHER PUBLICATIONS

Baghai-Ravary, L., & Beet, S. W. (1998). Multistep coding of speech parameters for compression. IEEE transactions on speech and audio processing, 6(5), 435-444.

(Continued)

*Primary Examiner* — Farzad Kazeminezhad (57) ABSTRACT

An improved method for transcribing/redacting VOIP calls on the fly produces redacted transcripts/audio, in real time, without producing any non-volatile storage footprint for unredacted call audio or transcripts.

20 Claims, 14 Drawing Sheets

(56) References Cited

U.S. PATENT DOCUMENTS

2020/0135178 A1* 4/2020 Park .................. G10L 15/22

OTHER PUBLICATIONS

Basu, S., Chakraborty, J., Bag, A, & Aftabuddin, M. (Mar. 2017), A review on emotion recognition using speech_ In 2017 International Conference on Inventive Communication and Computational Technologies (ICICCT) (pp. 109-114) IEEE.

Benesty, J., Sondhi, M. M., & Huang, Y. A. (2008). Springer Handbook of Speech Processing. Springer, Berlin, Heidelberg.

Biadsy, F. (2011). Automatic dialect and accent recognition and its application to speech recognition (Doctoral dissertation, Columbia University).

Borsky, M., Mizera, P., Pollak, P., & Nouza, J. (2017). Dithering techniques in automatic recognition of speech corrupted by MP3 compression: Analysis, solutions and experiments. Speech Communication, 86, 75-84.

Choueiter, G., Zweig, G., & Nguyen, P. (Mar. 2008). An empirical study of automatic accent classification. In 2008 EEE International Conference on Acoustics, Speech and Signal Processing (pp. 4265-4268). IEEE.

Fokoue, E., & Ma, Z. (2013). Speaker gender recognition via MFCCs and SVMs.

https://en.wikipedia.org/wiki/Sentiment_analysis (accessed on Dec. 6, 2020).

Hu, Y., Wu, D., & Nucci, A, (2012), Pitch-based gender identification with two-stage classification, Security and Communication Networks, 5(2), 211-225.

Huang, P.S., Kumar, K., Liu, C., Gong, Y., & Deng, L. (May 2013), Predicting speech recognition confidence using deep learning with word identity and score features. In 2013 IEEE International Conference on Acoustics, Speech and Signal Processing (pp. 7413-7417) IEEE.

Ivan, K., & Zhenghua, T. (Sep. 2014). Variable frame rate and length analysis for data compression in distributed speech recognition. In 2014 4th IEEE International Conference on Network Infrastructure and Digital Content (pp. 453-457). IEEE.

Jiang, H. (2005). Confidence measures for speech recognition: a survey. Speech communication, 45(4), 455-470.

Kulkarni, A. A. (2009). Performance evaluation of an open source speaker recognition system under the effect of speech compression in a real world VoIP environment (Doctoral dissertation, Purdue University).

Laxminarayana, P. Automatic Speech Recognition (ASR) Over VoIP and Wireless Networks.

Litman, D., Hirschberg, J., & Swerts, M. (2000). Predicting automatic speech recognition performance using prosodic cues_ In 1st Meeting of the North American Chapter of the Association for Computational Linguistics.

M. Handley, "Speech Compression."

Meinedo, H., & Trancoso, I. (2011 )_ Age and gender detection in the I-DASH project. ACM Transactions on Speech and Language Processing (TSLP), 7(4), 1-16.

Nguyen, P., Tran, D., Huang, X., & Sharma, D, (Aug. 2010), Automatic classification of speaker characteristics. In International Conference on Communications and Electronics 2010 {pp. 147-152). IEEE.

Non Final Office Action received for U.S. Appl. No. 17/109,445 dated Feb. 11, 2022, 43 pages.

Notice of Allowance received for U.S. Appl. No. 17/109,445 dated Apr. 28, 2022, 18 pages.

Pollak, P ., & Behunek, M. (Jul. 2011). Accuracy of MP3 speech recognition under real-word conditions: Experimental study. In Proceedings of the International Conference on Signal Processing and Multimedia Applications (pp. 1-6). IEEE.

Rajvanshi, K., & Khunteta, A. (2018). An Efficient Approach for Emotion Detection from Speech Using Neural Networks. International Journal for Research in Applied Science & Engineering Technology, 6(05).

Reddy, A. P., & Vijayarajan, V. (2020). Audio compression with multi-algorithm fusion and its impact in speech emotion Recognition. International Journal of Speech Technology, 1-9.

Sidana, M. (2017). Top five emotion/sentiment analysis APIs for understanding user sentiment trends.

Singh, S., Assaf, M. H., & Kumar, A. (2016). A Novel Algorithm of Sparse Representations for Speech Compression/Enhancement and Its Application in Speaker Recognition System. International Journal of Computational and Applied Mathematics, 11(1), 89-104.

Sun, L., Mkwawa, I. H., Jammeh, E., & Ifeachor, E. (2013). Guide to voice and video over IP: for fixed and mobile networks_ Springer Science & Business Media.

Tucker, S., & Whittaker, S. (2008). Temporal compression of speech: an evaluation. IEEE transactions on audio, speech, and language processing, 16(4), 790-796.

Venkateswarlu, S. C., Prasad, K. S., & Reddy, A. S. (2011). Improve Speech Enhancement Using Weiner Filtering. Global Journal of Computer Science and Technology.

Wagner, J. (2005). EmoVoice-Real-Time Emotion Recognition from Speech. Published on: Jan. 1.

* cited by examiner

ON-THE-FLY TRANSCRIPTION/REDACTION OF VOICE-OVER-IP CALLS

CROSS-REFERENCE TO RELATED APPLICATIONS

This application incorporates from two commonly-owned, co-pending U.S. applications: Ser. No. 16/162,997 "Use of ASR Confidence to Improve Reliability of Automatic Audio Redaction," filed Oct. 17, 2018, now issued as U.S. Pat. No. 11,138,334; and U.S. application Ser. No. 16/371,014, "ASR-enhanced Speech Compression." filed Mar. 31, 2019, now issued as U.S. Pat. No. 10,872,615. Both applications are incorporated herein by reference.

BACKGROUND OF THE INVENTION

Modern telephony operates using the voice-over-IP (VOIP) protocol. Call capture/recording technology is widely deployed on VoIP networks. Such technology is available from many vendors, including AT&T, NICE, and Verint. See, e.g., U.S. Pat. No. 7,738,638, "Voice over internet protocol call recording" (AT&T), U.S. Pat. No. 8,165,114, "Voice over IP capturing" (NICE), and U.S. Pat. No. 8,204,053, "Systems and methods for providing network services for recording" (Verint).

Routine call capture/recording serves several business needs. In some industries (e.g., financial services), there exist legal requirements that some or all customer calls be recorded and maintained for a number of (e.g., seven) years. But even in industries/environments where call recording is not required, businesses find it useful to drive internal business functions.

For example, recorded calls can be transcribed—using a large-vocabulary speech-to-text engine, such as the assignee's V-Blaze engine, a phonetic recognition engine, or a pool of human transcribers—with the resulting text used to feed a text analytics engine, either alone or in combination with other text sources, such as chat, social media, and web. Additionally, recorded calls can be analyzed for trend-spotting issues such as agent performance (e.g., compliance with recommended scripts), agent malperformance (e.g., agent use of swear words, or negative vocal tone), customer dissatisfaction (e.g., customer use of swear words, or negative vocal tone), and agent compliance with legal requirements (e.g., the so-called mini-Miranda warning that debt collectors are required to issue). Finally, in the event of a specific customer complaint or dispute (e.g., "I didn't order that . . . " or "the agent was rude"), the recorded call provides the ultimate record from which a supervisor can investigate and resolve such issues.

While archives of recorded calls serve many useful functions, they also create some well-known problems for their owners. One basic challenge is storage capacity. A typical large enterprise might service millions of calls per day, which can quickly produce immense quantities of data—especially if the calls are recorded in an uncompressed or lightly compressed format. Traditionally, the approach has been to store the recorded calls in a highly-compressed format. However, this "solution" poses its own challenges, as such highly-compressed calls are difficult to understand, even by human transcribers, but especially by automatic speech recognition (ASR) engines.

Another well-known challenge posed by large archives of recorded calls is the inability to effectively search them, or even to know what information they might contain. This becomes particularly troublesome in the event of government investigations or civil litigation. In such cases, the archive owner might be required to produce, to the investigative agency or opposing litigation party, "all calls in which a prospective client or employee was asked whether s/he had any disability." In such a circumstance, it is not an adequate solution for the archive owner simply to produce everything in the archive.

Still another well-known challenge posed by large archives of recorded calls is the data security risk that they create. It is very common, if not the norm, that recorded customer calls will contain sensitive information, such as credit card numbers, social security numbers, health information, etc. Moreover, virtually all recorded customer calls will contain basic personal information—such as name, address, telephone number—that, while not particularly sensitive, is nonetheless still subject to privacy laws and regulations. While the archive can be technologically "protected" through use of encryption and access controls, the mere fact that it contains sensitive and/or private information will subject its owner to substantial security regulations.

Thus, there remains a substantial need for improved systems of audio capture and archiving that address these well-known deficiencies in currently deployed systems.

OBJECTS AND SUMMARY OF THE INVENTION

One object of the present invention relates to improved systems/methods for capturing and processing audio data from VOIP calls.

Another object of the invention relates to improved systems/methods for transcribing audio data captured from VOIP calls.

Still another object of the invention relates to systems/methods for redacting audio data captured from VOIP calls prior to archiving such data.

Yet another object of the invention relates to systems/methods for capturing and transcribing audio data from VOIP calls without any use of non-volatile storage media (and/or without storing the captured audio data anywhere that will persist for an extended period after the transcription task is completed).

Still another object of the invention relates to systems/methods for on-the-fly, real-time transcription of VOIP calls.

And a yet further object of the invention relates to improved call monitoring/alerting systems that utilize a real-time transcription of a VOIP call to provide more timely or effective alerts and supervisor intervention opportunities.

Accordingly, generally speaking, and not intending to be limiting, one aspect of the invention relates to methods for processing audio data without creating a non-volatile stored record of such audio data by, for example, performing at least the following steps: receiving audio data and storing it only into a volatile audio buffer memory; and, utilizing a direct-to-transcription (DtT) automatic speech recognition (ASR) engine to convert at least some of the audio data, representing a word or utterance, to corresponding textual data, without creating a non-volatile stored record of such audio data or textual data, and make said textual data available in a volatile text buffer memory. In some embodiments, the volatile audio buffer memory is contained within the DtT ASR engine. In some embodiments, the volatile text buffer memory is contained within the DtT ASR engine. In some embodiments, the DtT ASR engine includes an acoustic processing module. In some embodiments, the acoustic processing module utilizes a deep neural net (DNN) acoustic model to process the audio data. In some embodiments, the acoustic processing module fetches required portions of the DNN acoustic model from a non-volatile memory that contains the DNN acoustic model. In some embodiments, the DNN acoustic model is a long short-term memory (LSTM) acoustic model. In some embodiments, the DtT ASR engine further includes a weighted finite state transducer (WFST) search module. In some embodiments, the DET ASR engine fetches required portions of a recurrent neural network language model (RNNLM) from a non-volatile memory that contains the RNNLM. In some embodiments, the RNNLM is a LSTM language model. In some embodiments, the receiving audio data step may involve obtaining data directly from a voice-over Internet protocol (VOIP) telephony network using an active recording protocol. In some embodiments, the audio receiving step may utilize a port mirroring switch to obtain data directly from a VoIP telephony network by packet sniffing. In some embodiments, the DtT ASR engine includes a DtT adapter module and an ASR engine. In some embodiments, the DET ASR engine may further include an audio/text redaction engine. In some embodiments, the audio processing method may further comprise the step of using the audio/text redaction engine to produce redacted textual data and corresponding redacted audio data. In some embodiments, the audio processing method operates in real time to provide the redacted textual data within one second of the time that the converted word or utterance was received in the volatile audio memory. In some embodiments, the audio processing method further comprises the step of providing the redacted textual data, in real time, to a customer analytics platform. In some embodiments, the audio processing method further comprises the step of providing the redacted textual data, in real time, to an agent monitoring or supervisor alerting platform. In some embodiments, the audio processing method further comprises the step of providing the redacted textual data, in real time, to a workflow management system. And in some embodiments, the audio processing method further comprises the step of providing the redacted textual data and redacted audio data to a call recording server.

BRIEF DESCRIPTION OF THE FIGURES

These, as well as other, aspects, features, and advantages are shown in the accompanying set of figures, in which.

DESCRIPTION OF EXEMPLARY/PREFERRED EMBODIMENTS

Figure 1:
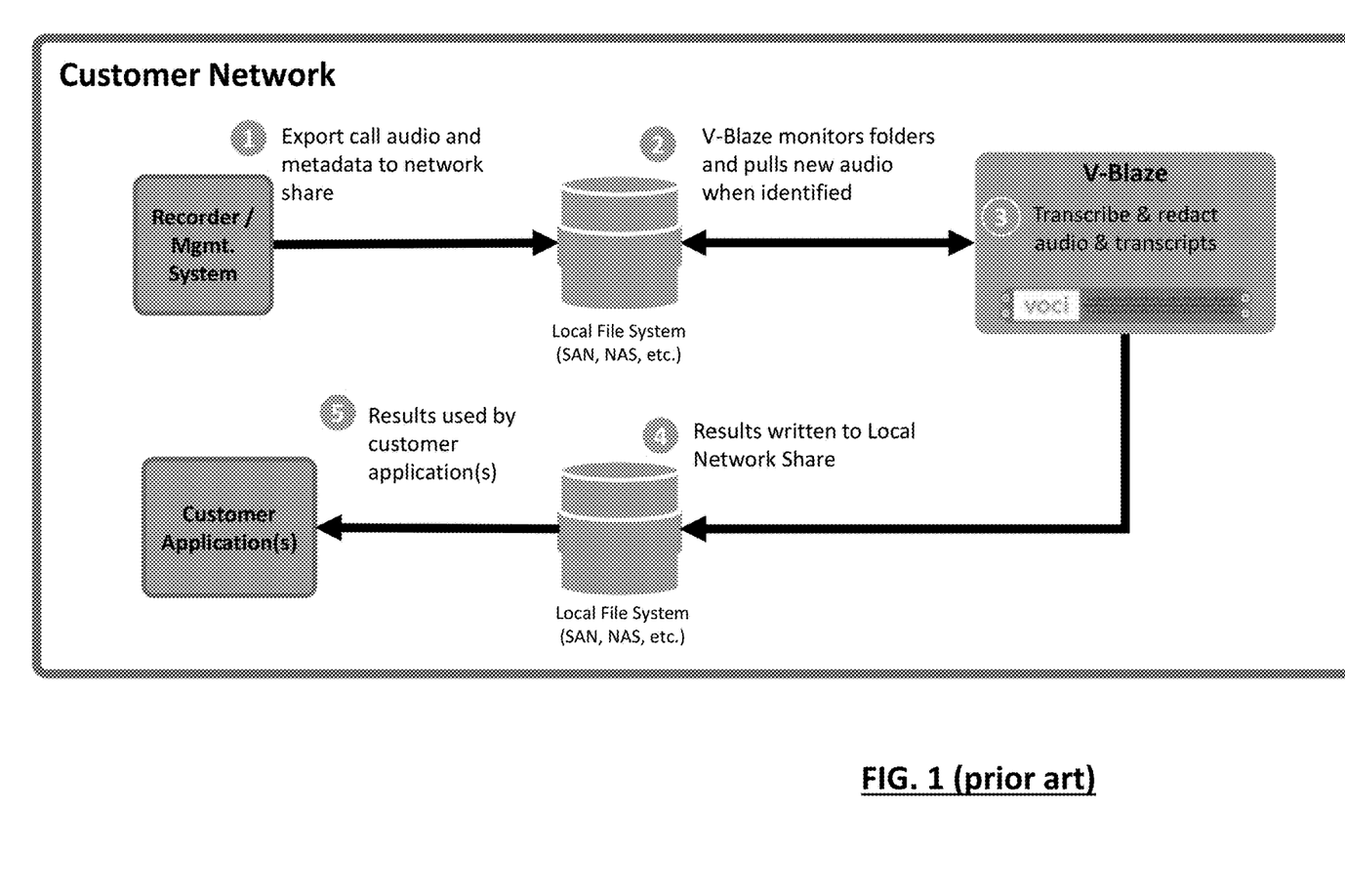
FIG. 1 depicts an exemplary architecture of a traditional (prior art) call transcription and analytics system.
Figure 2:
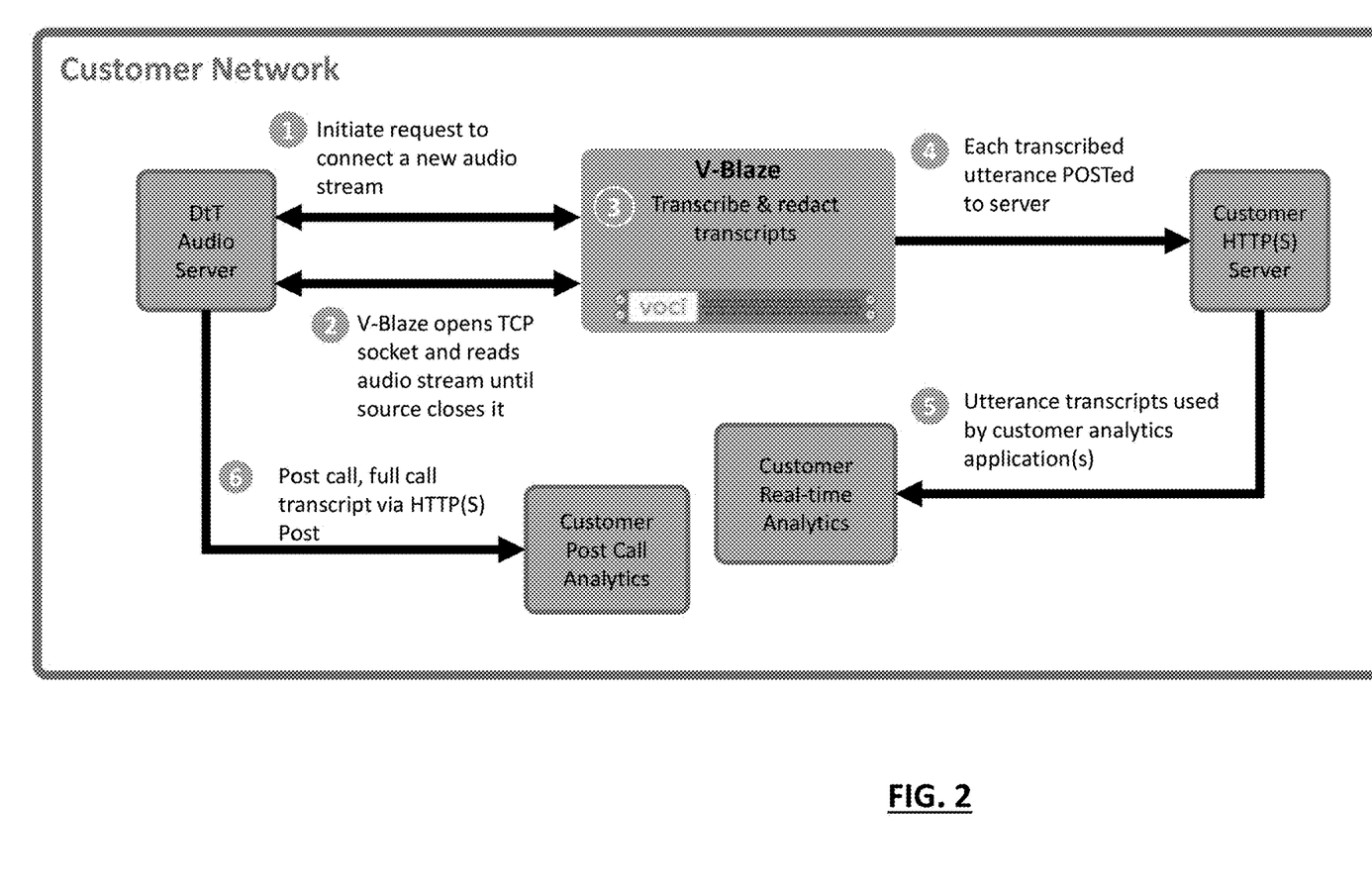
FIG. 2 depicts an exemplary, high-level architecture for on-the-fly transcription in accordance with certain embodiments of the invention.

Referring to FIG. 2, which depicts an exemplary, high-level architecture for on-the-fly transcription in accordance with certain embodiments of the invention, the exemplary process initiates with a request from an ASR/redaction engine (in this case, the assignee's commercial V-Blaze engine) to connect to a new audio stream. Subsequent steps 2-5 result in a stream of (redacted) transcripts being supplied, in real time, to the customer's real-time analytics platform.

Figure 3:
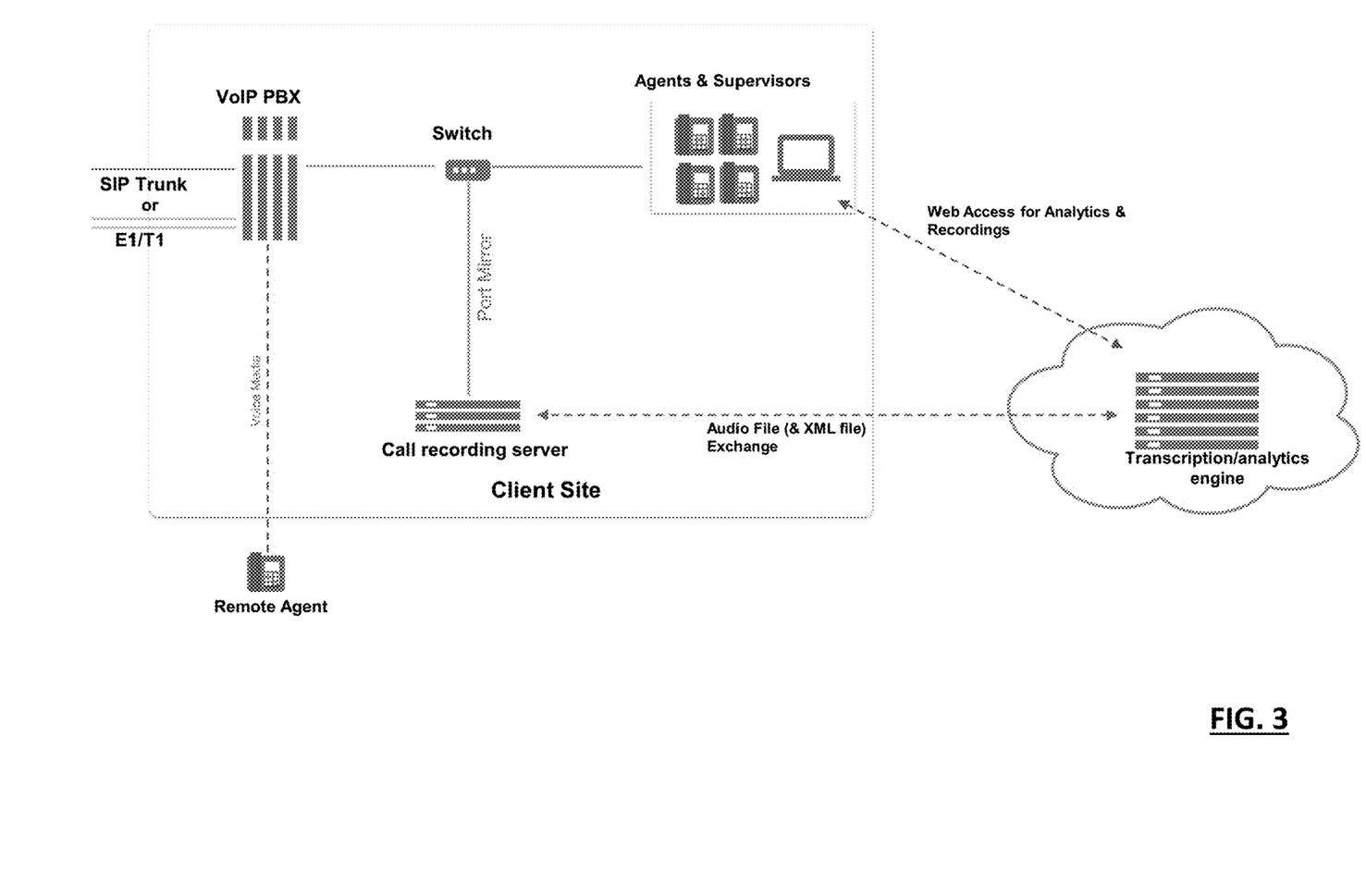
FIG. 3 depicts a call recording deployment that includes an on-premises VoIP PBX and on-premises call recording server connected by port mirroring.

Referring now to FIG. 3, which depicts a call recording deployment that includes an on-premises VoIP PBX and on-premises call recording server connected by port mirroring, this represents one possible use case where the inventive improvements can be employed.

Figure 4:
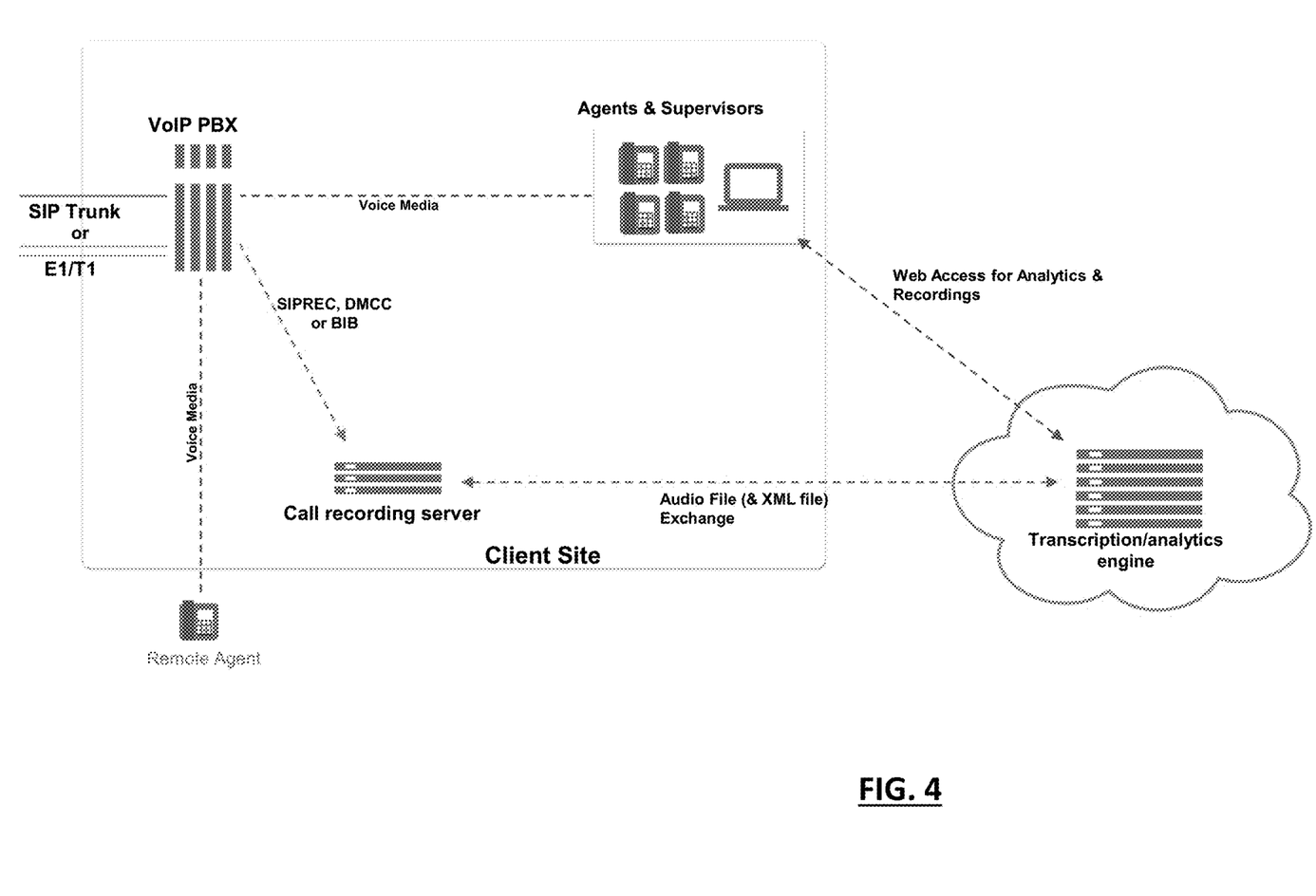
FIG. 4 depicts a call recording deployment that includes an on-premises VoIP PBX and on-premises call recording server connected directly to the on-premises PBX.

Referring now to FIG. 4, which depicts a call recording deployment that includes an on-premises VoIP PBX and on-premises call recording server connected directly to the on-premises PBX, this represents another possible use case where the inventive improvements can be employed.

Figure 5:
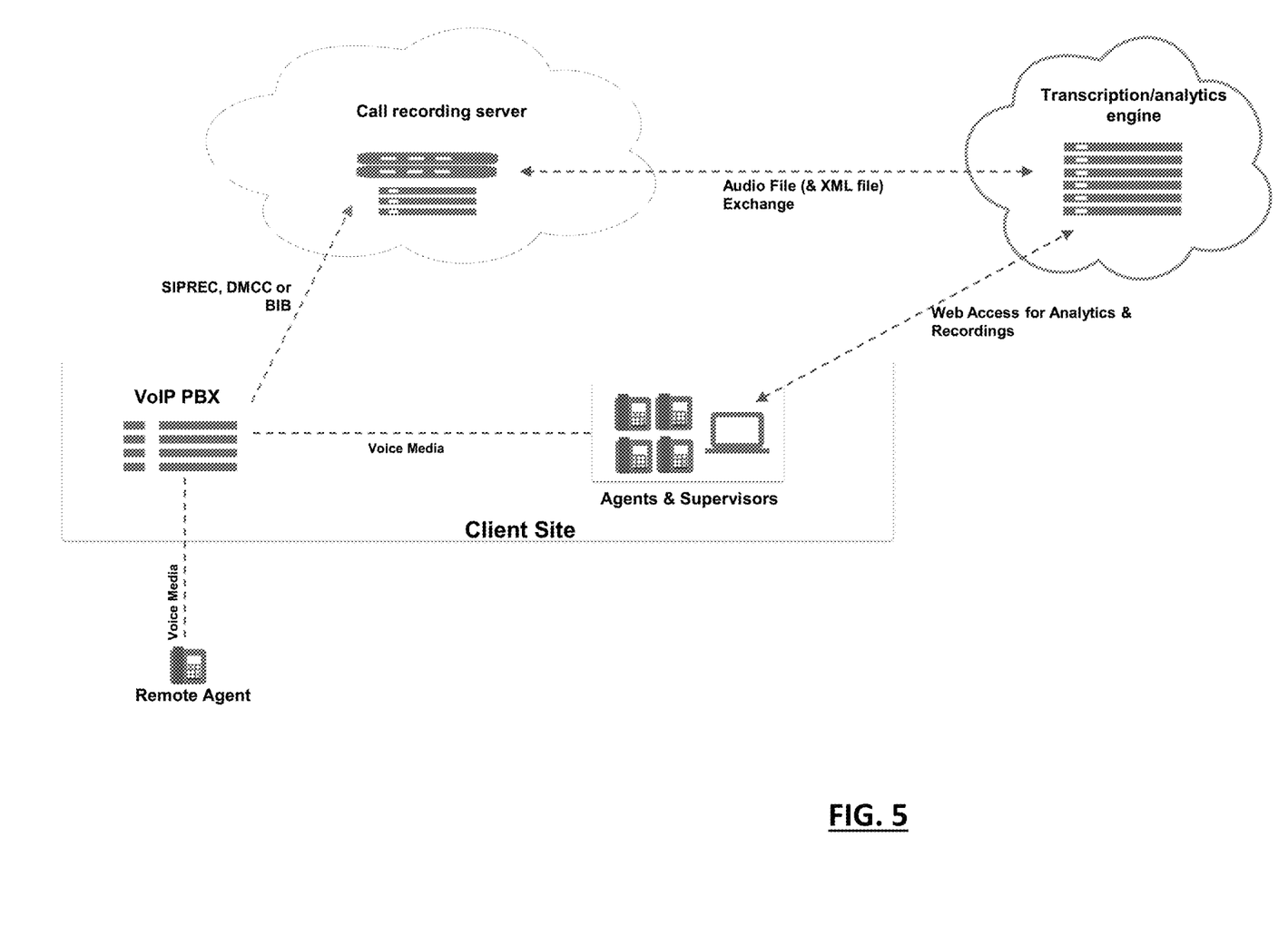
FIG. 5 depicts a call recording deployment that includes an on-premises VoIP PBX coupled to a cloud-based call recording server (although the figure shows a direct connection from the PBX, persons skilled in the art will appreciate that on-premises port mirroring could also be used)

Referring now to FIG. 5, which depicts a call recording deployment that includes an on-premises VoIP PBX coupled to a cloud-based call recording server (although the figure shows a direct connection from the PBX, persons skilled in the art will appreciate that on-premises port mirroring could also be used), this represents another possible use case where the inventive improvements can be employed.

Figure 6:
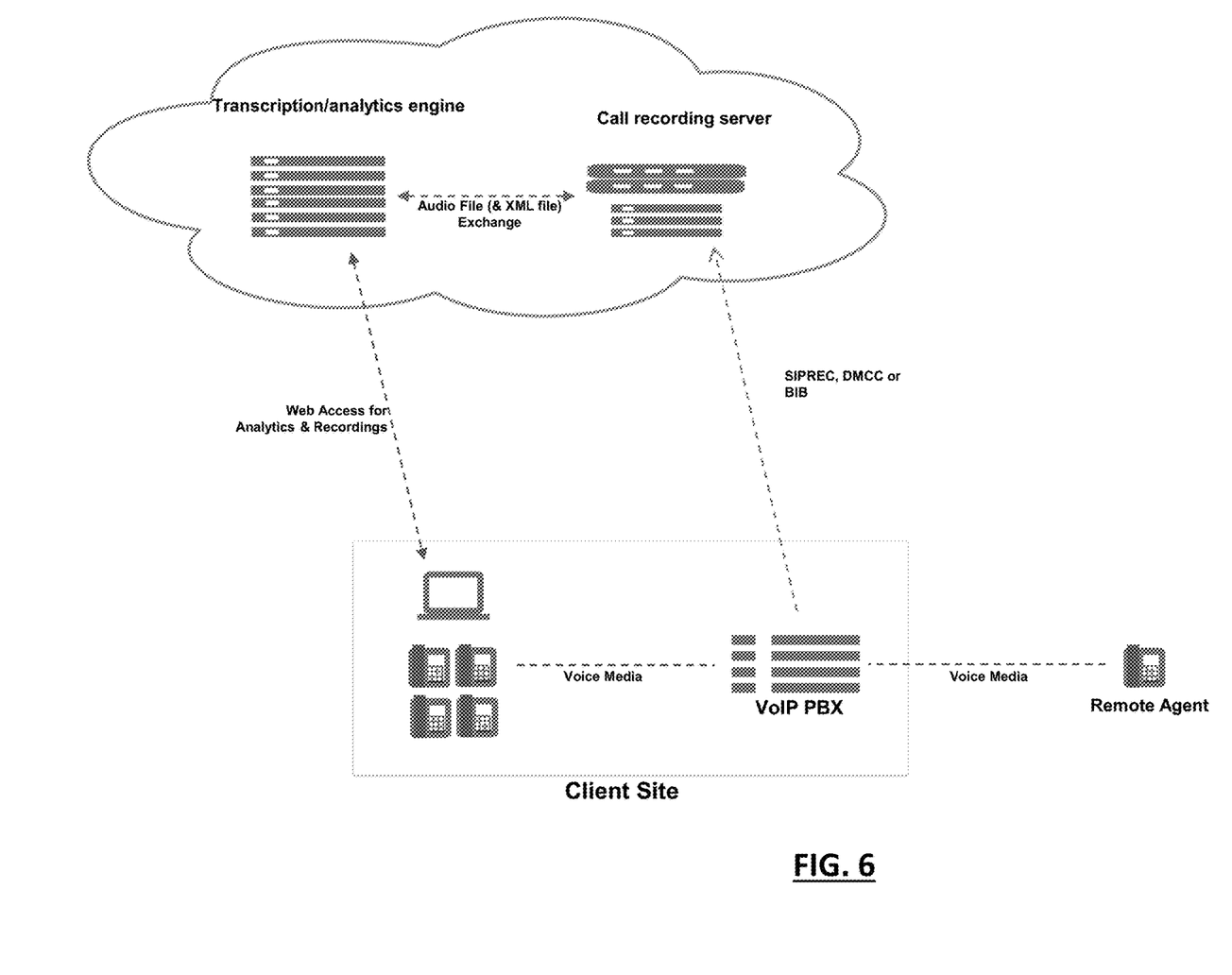
FIG. 6 depicts a call recording deployment that includes a cloud-based VoIP PBX coupled to a cloud-based call recording server (although the figure shows a direct connection from the PBX, persons skilled in the art will appreciate that on-premises port mirroring could also be used)

Referring now to FIG. 6, which depicts a call recording deployment that includes an on-premises VoIP PBX coupled to a cloud-based call recording server (although the figure shows a direct connection from the PBX, persons skilled in the art will appreciate that on-premises port mirroring could also be used), this represents another possible use case where the inventive improvements can be employed.

Figure 7:
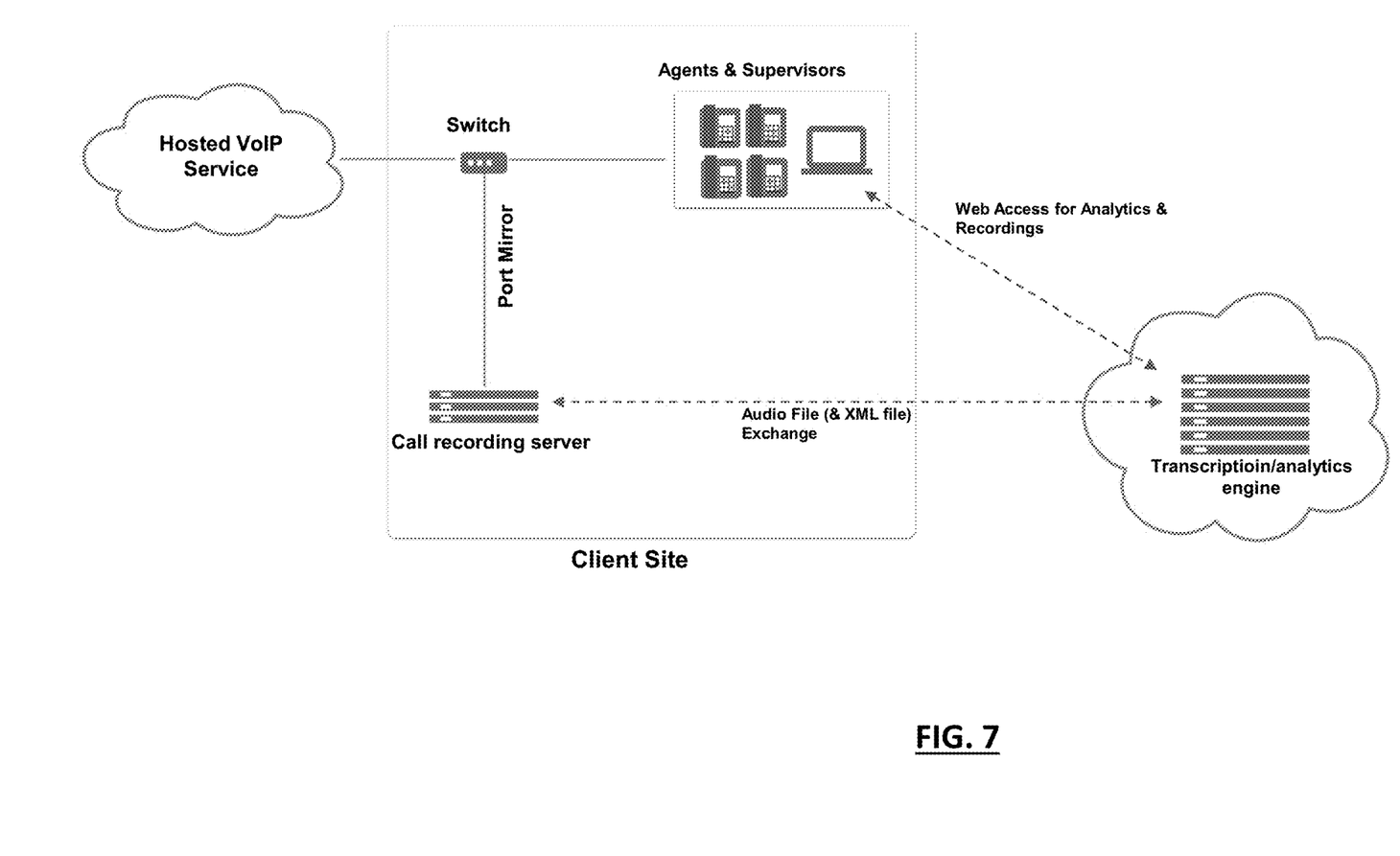
FIG. 7 depicts a call recording deployment that includes a hosted VoIP telephony service, on-premises recording, and transcription/analytics in the cloud.

Referring now to FIG. 7, which depicts a call recording deployment that includes a hosted VoIP telephony service, on-premises recording, and transcription/analytics in the cloud, this represents another possible use case where the inventive improvements can be employed.

Figure 8:
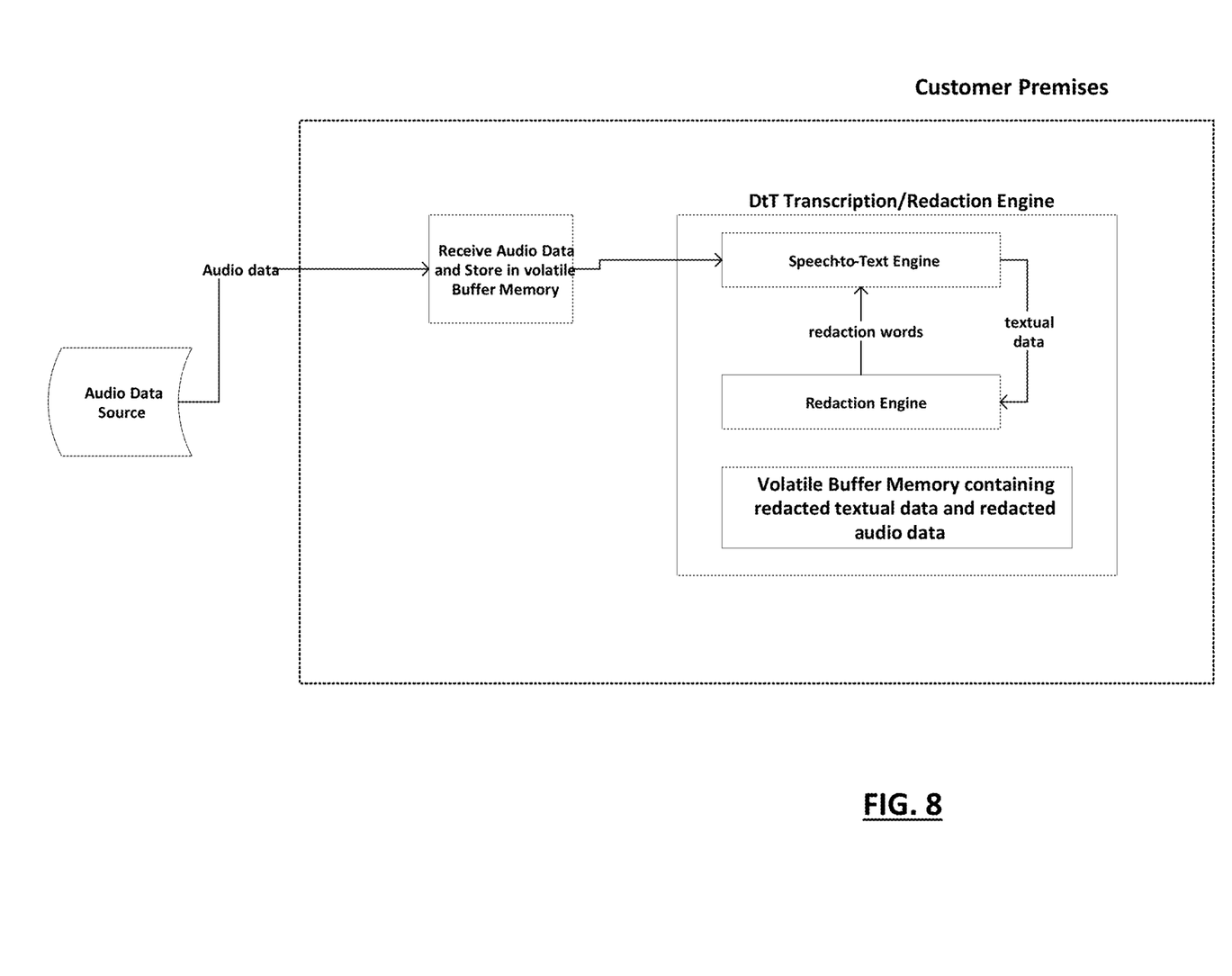
FIG. 8 is a flowchart of an exemplary direct-to-transcription (DtT) conversion/redaction process in accordance with certain embodiments of the invention.

Referring now to FIG. 8, which is a flowchart of an exemplary direct-to-transcription (DtT) conversion/redaction process in accordance with certain embodiments of the invention, audio is received/captured into a volatile memory buffer, from which words/utterances are provided to the DtT transcription/redaction engine. The transcription/redaction engine includes two main components, a speech-to-text engine and a redaction engine, which operate cooperatively to produce redacted textual and audio data, which is again stored in a volatile buffer memory, until it is either pushed or pulled from that buffer to its next destination. This overall flow, which produces no non-volatile stored record of the audio (or its ASR transcription) until after redaction provides substantial security/privacy advantages to the inventive flow.

A preferred form of the redaction engine can be found in the incorporated, co-pending '997 application. Additional redaction resources can be found at: L Hirschman, "Hiding in Plain Sight: De-identification of Clinical Narrative," MITRE Corp., Oct. 26, 2015 (incorporated herein by reference; copy available at http://projects.iq.harvard.edu/files/researchdataaccessandinnovationsymposium/files/hiding-_in_plain sight_lynettehirschman.pdf); see also "MIST: The MITRE Identification Scrubber Toolkit," v. 2.04 (incorporated herein by reference; available at http://mist-de-id.sourceforge.net). See also scrubadub, v. 1.2.0 (incorporated herein by reference; available at http://scrubadub.readthedocs.io/en/stable/index.html); "De-identifying sensitive data in text content," Google Cloud (incorporated herein by reference; available at https://cloud.google.com/dlp/docs/deidentify-sensitive-data).

An important part of the redaction process involves identification of named entities. See, e.g., Project t3as-redact ("The redaction application uses automatic Named Entity Recognition to highlight names of people, organizations, locations, dates/times/durations and numbers; which are likely targets for redaction.") (incorporated herein by reference; available at https://github.com/NICTA/t3as-redact). Several named entity recognizers—CoreNLP with Corefs; CoreNLP; OpenNLP; and NICTA NER—are available as part of the t3as-redact package.

Figure 9:
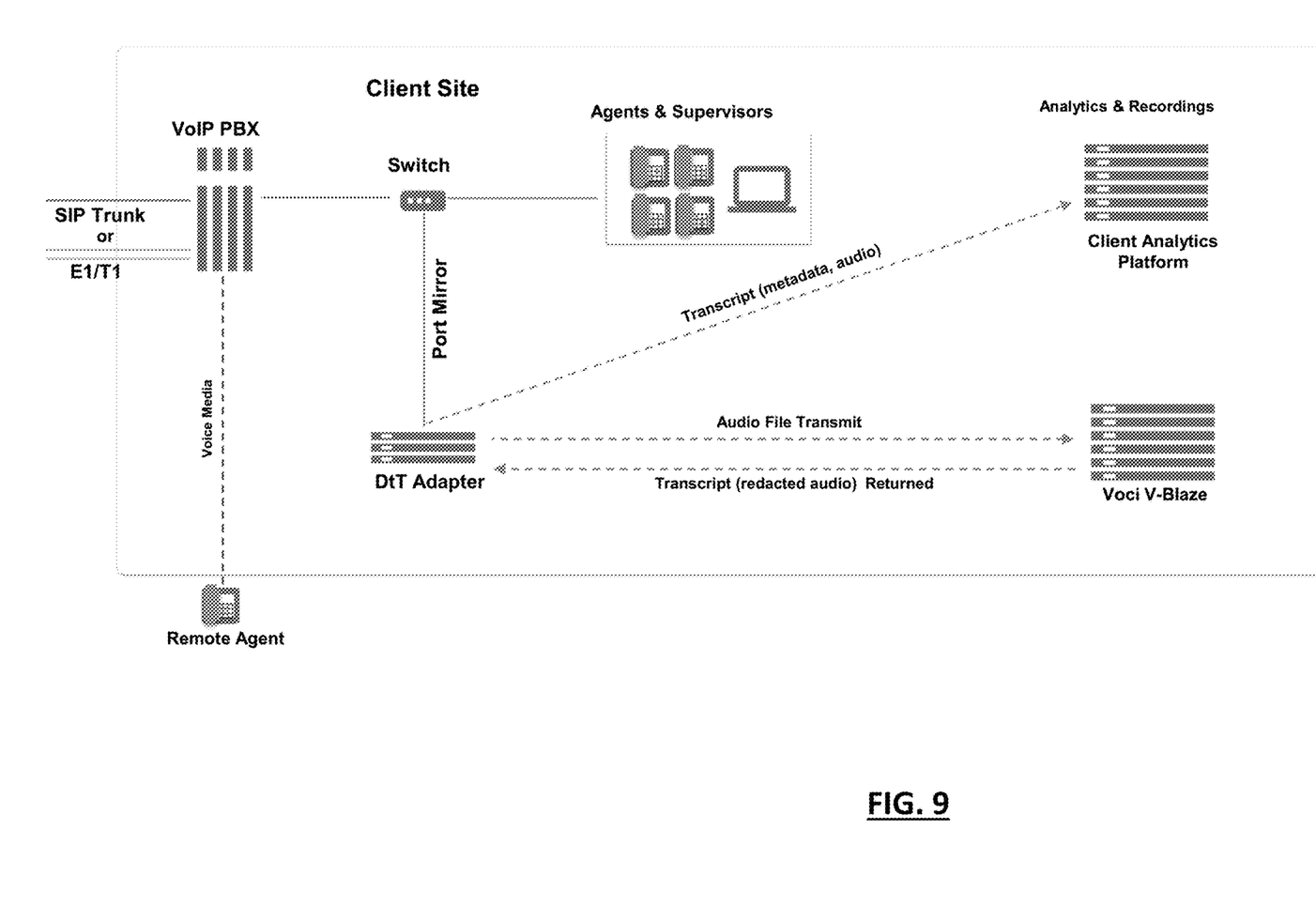
FIG. 9 depicts an exemplary embodiment of the invention that includes an on-premises automatic call distributor (ACD), on-premises transcription, and port mirroring.

Referring now to FIG. 9, it depicts an exemplary embodiment of the invention that includes an on-premises automatic call distributor (ACD), on-premises transcription, and port mirroring.

Figure 10:
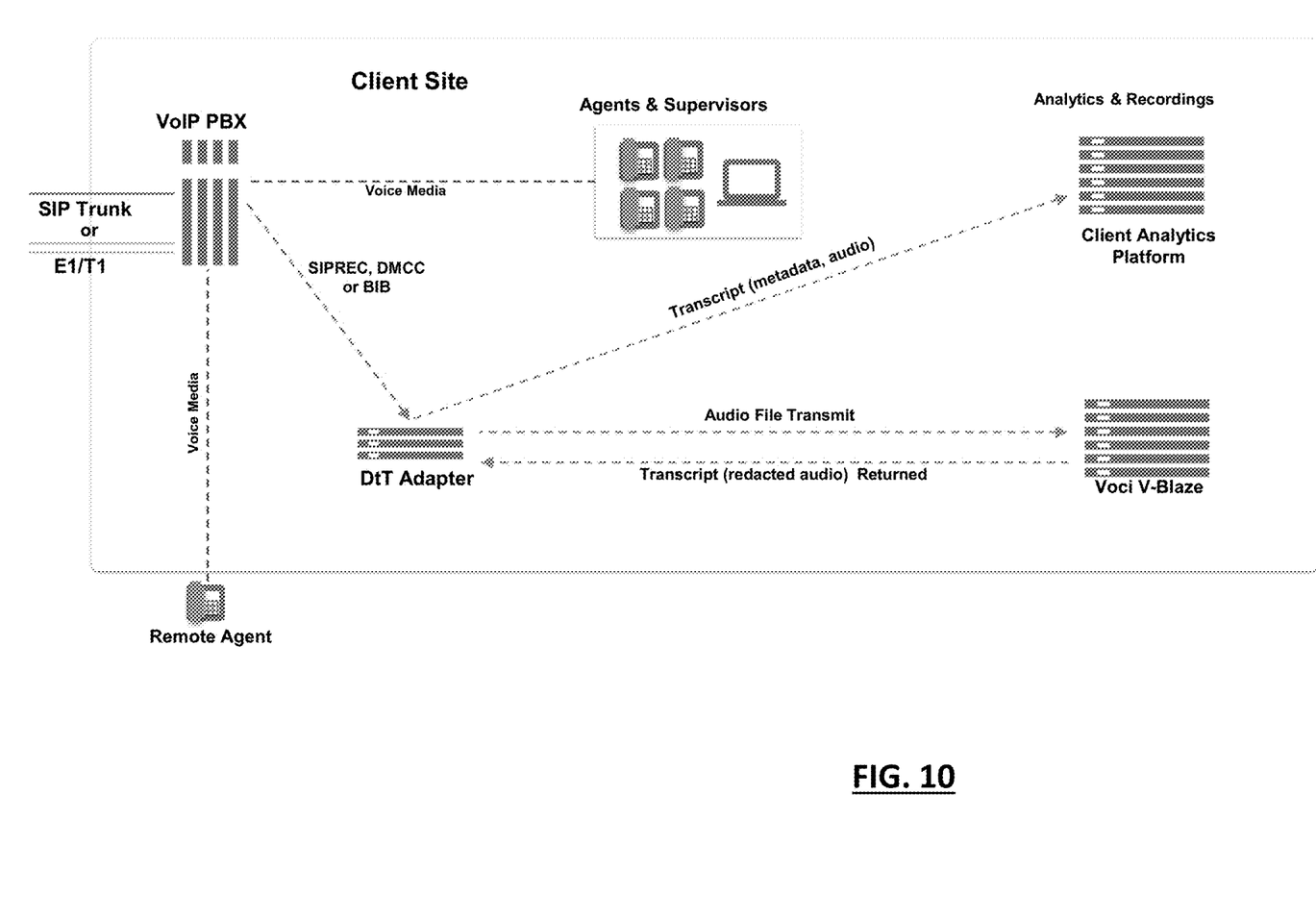
FIG. 10 depicts an exemplary embodiment of the invention that includes an on-premises ACD, on-premises transcription, and active recording.

Referring now to FIG. 10, it depicts an exemplary embodiment of the invention that includes an on-premises ACD, on-premises transcription, and active recording.

Figure 11:
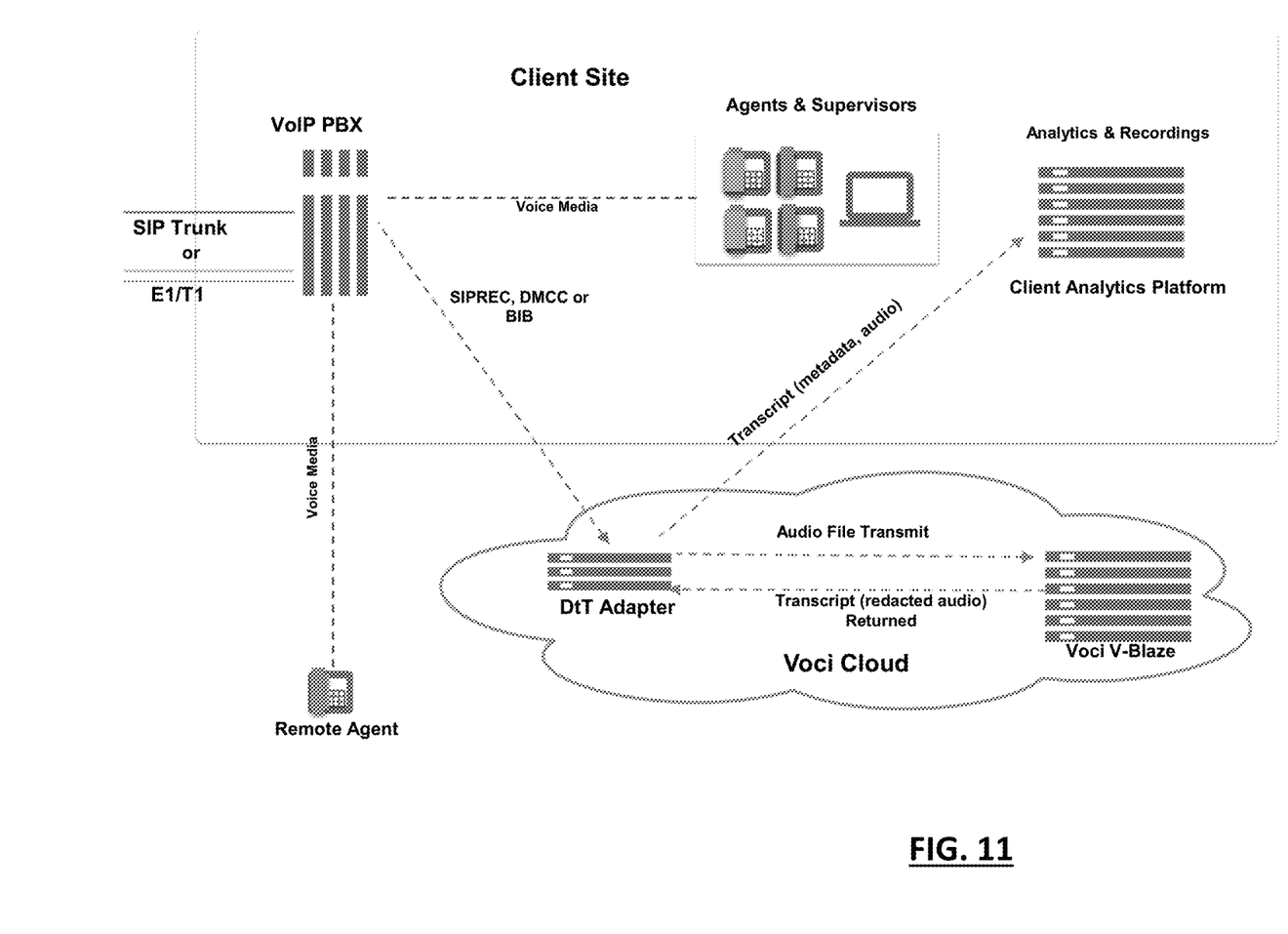
FIG. 11 depicts an exemplary embodiment of the invention that includes an on-premises ACD, cloud-based transcription, and active recording.

Referring now to FIG. 11, it depicts an exemplary embodiment of the invention that includes an on-premises ACD, cloud-based transcription, and active recording.

Figure 12:
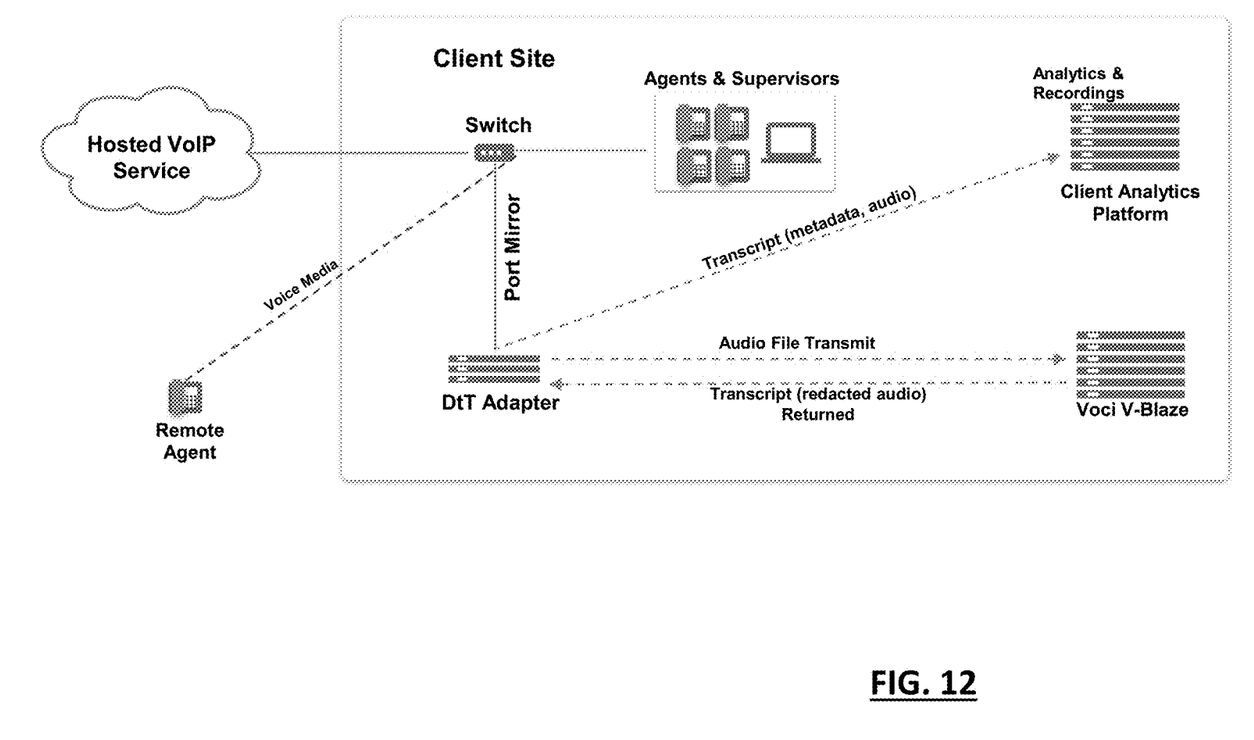
FIG. 12 depicts an exemplary embodiment of the invention that includes a hosted ACD, on-premises transcription, and port mirroring.

Referring now to FIG. 12, it depicts an exemplary embodiment of the invention that includes a hosted ACD, on-premises transcription, and port mirroring.

Figure 13:
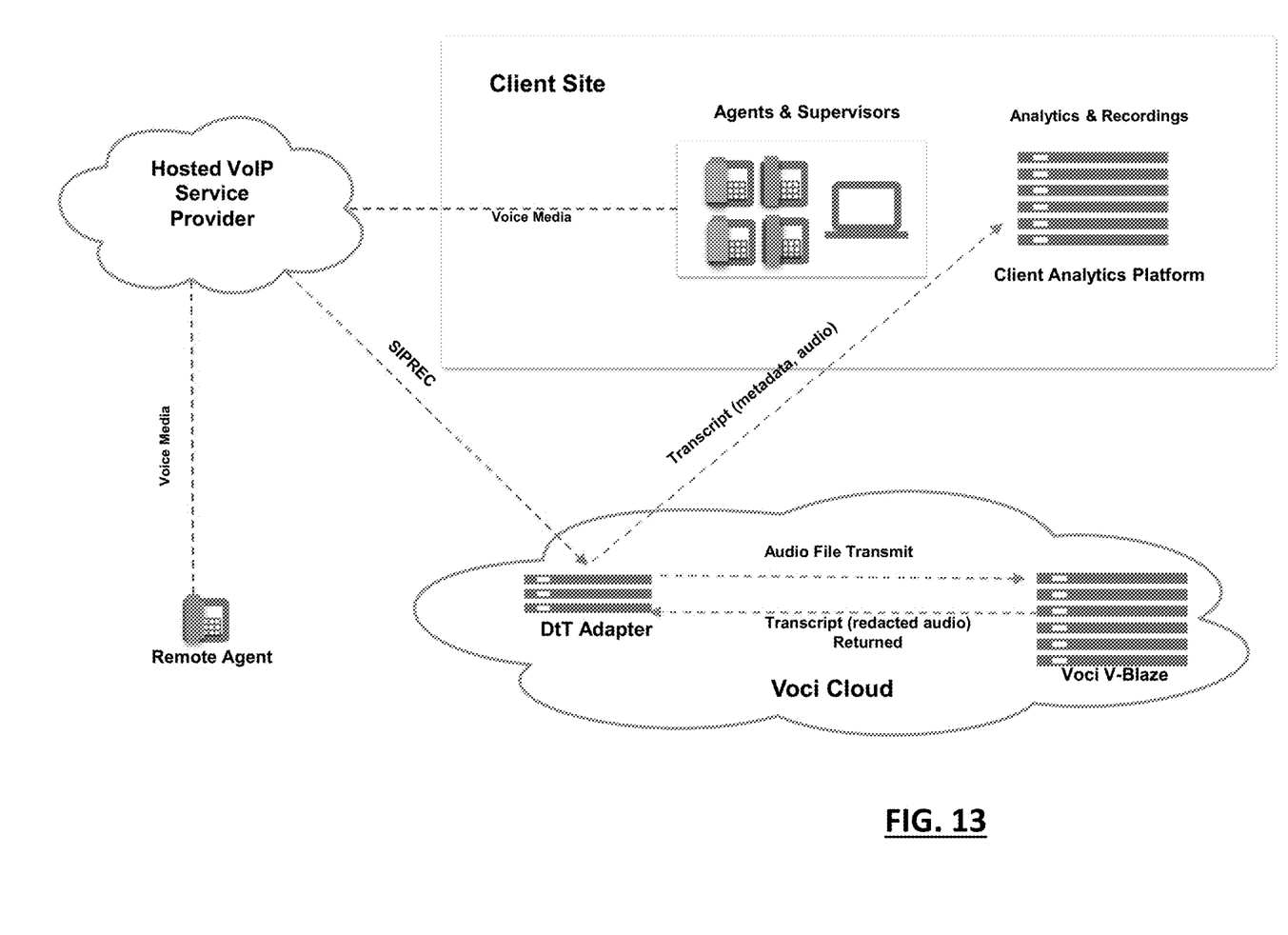
FIG. 13 depicts an exemplary embodiment of the invention that includes a hosted ACD, cloud-based transcription, and active recording.

Referring now to FIG. 13, it depicts an exemplary embodiment of the invention that includes a hosted ACD, cloud-based transcription, and active recording.

Figure 14:
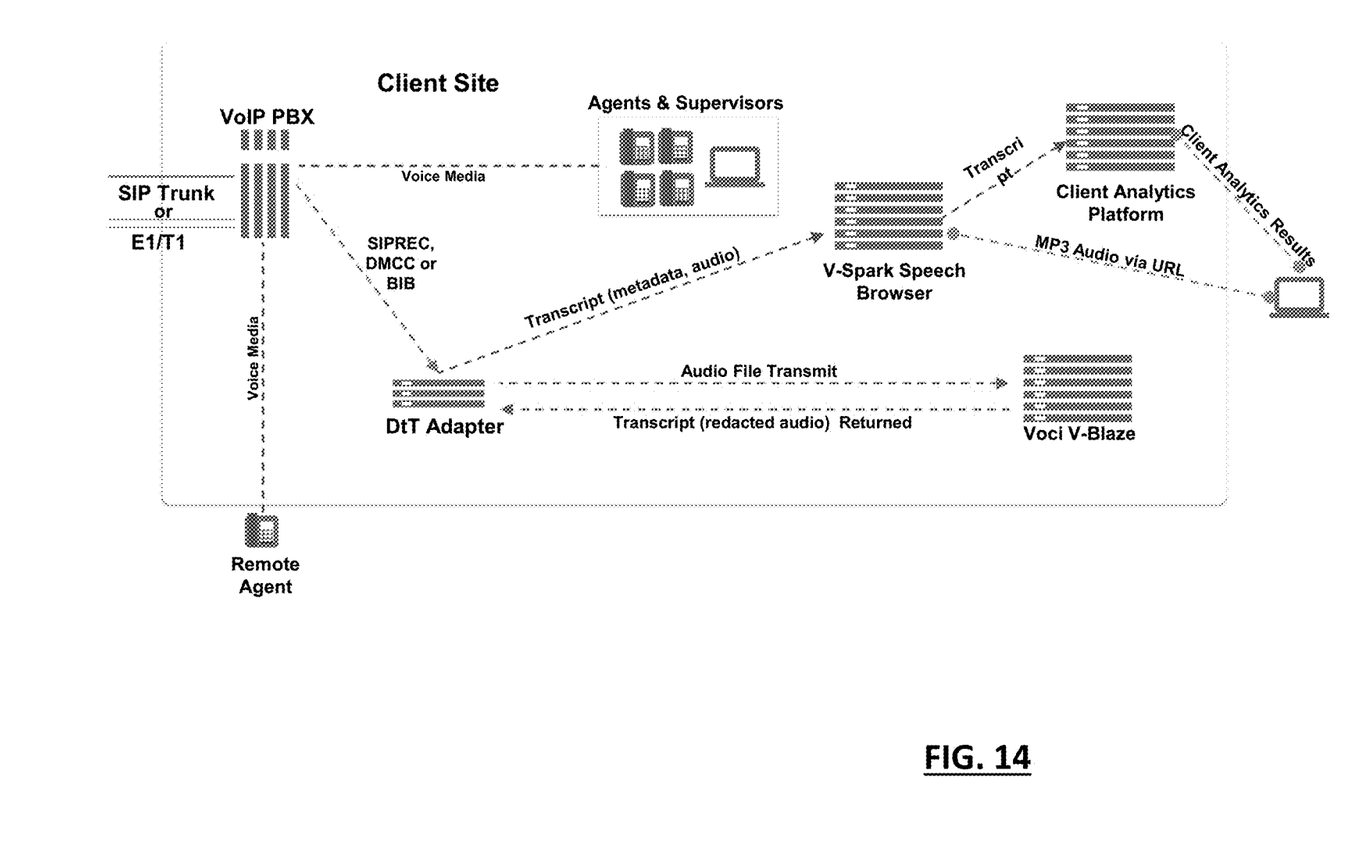
FIG. 14 depicts an exemplary embodiment of the invention that includes an on-premises ACD, on-premises transcription, active recording, and speech browser (V-Spark) integration.

Referring now to FIG. 14, it depicts an exemplary embodiment of the invention that includes an on-premises ACD, on-premises transcription, active recording, and speech browser integration. Here, the exemplary speech browser is the assignee's V-Spark product.

As used herein in reference to physical, on-premises computing equipment, "non-volatile storage media" should be given its traditional definition, i.e., "a type of computer memory that can retrieve stored information even after having been power cycled." https://en.m.wikipedia.org/wiki/Non-volatile memory.

As used herein in reference to virtual or cloud-based computing resources, "non-volatile storage media" shall mean "any data store that remains accessible after the processing is completed and the processing resource is released."

What is claimed in this application is:

1. A method for processing audio data without creating a non-volatile stored record of said audio data, said method comprising at least the following steps:
   receiving audio data and storing it only into a volatile audio buffer memory;
   utilizing a direct-to-transcription (DtT) automatic speech recognition (ASR) engine to:
      convert at least some of said audio data, representing a word or utterance, to corresponding textual data, without creating a non-volatile stored record of said audio data or said textual data; and
      make said textual data available in a volatile text buffer memory.

2. The audio processing method of claim 1, wherein the DtT ASR engine includes:
   a DtT adapter module; and
   an ASR engine.

3. The audio processing method of claim 2, wherein the DtT ASR engine further includes an audio/text redaction engine.

4. The audio processing method of claim 3, further comprising the step of:
   using the audio/text redaction engine to produce redacted textual data and corresponding redacted audio data.

5. The audio processing method of claim 4, wherein the method operates in real time to provide the redacted textual data within one second of the time that the converted word or utterance was received in the volatile audio memory.

6. The audio processing method of claim 5, further comprising the step of providing the redacted textual data, in real time, to a customer analytics platform.

7. The audio processing method of claim 5, further comprising the step of providing the redacted textual data, in real time, to an agent monitoring/supervisor alerting platform.

8. The audio processing method of claim 5, further comprising the step of providing the redacted textual data, in real time, to a workflow management system.

9. The audio processing method of claim 5, further comprising the step of providing the redacted textual data and redacted audio data to a call recording server.

10. The audio processing method of claim 1, wherein the DtT ASR engine includes an acoustic processing module.

11. The audio processing method of claim 10, wherein the DtT ASR engine further includes a weighted finite state transducer (WFST) search module.

12. The audio processing method of claim 11, wherein the DtT ASR engine fetches required portions of a recurrent neural network language model (RNNLM) from a non-volatile memory that contains the RNNLM.

13. The audio processing method of claim 12, wherein the RNNLM is a LSTM language model.

14. The audio processing method of claim 1, wherein the ASR includes an acoustic processing module that utilizes a deep neural net (DNN) acoustic model to process said audio data.

15. The audio processing method of claim 14, wherein the acoustic processing module fetches required portions of said DNN acoustic model from a non-volatile memory that contains the DNN acoustic model.

16. The audio processing method of claim 15, wherein the DNN acoustic model is a long short-term memory (LSTM) acoustic model.

17. The audio processing method of claim 1, wherein the volatile audio buffer memory is contained within the DtT ASR engine.

18. The audio processing method of claim 17, wherein the volatile text buffer memory is contained within the DtT ASR engine.

19. The audio processing method of claim 1, wherein the receiving audio data step involves obtaining data directly froma voice-over Internet protocol (VOIP) telephony network using anactive recording protocol.

20. The audio processing method of claim 1, wherein the audio receiving step utilizes a port mirroring switch to obtain data directly from a VoIP telephony network by packet sniffing.

* * * * *